US012589776B2

(12) United States Patent
Sun et al.

(10) Patent No.: US 12,589,776 B2
(45) Date of Patent: Mar. 31, 2026

(54) DATA-DRIVEN PREDICTION-BASED SYSTEM AND METHOD FOR TRAJECTORY PLANNING OF AUTONOMOUS VEHICLES

(71) Applicant: TUSIMPLE, INC., San Diego, CA (US)

(72) Inventors: Xing Sun, San Diego, CA (US); Wutu Lin, San Diego, CA (US); Liu Liu, San Diego, CA (US); Kai-Chieh Ma, San Diego, CA (US); Zijie Xuan, San Diego, CA (US); Yufei Zhao, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 180 days.

(21) Appl. No.: 18/507,038

(22) Filed: Nov. 11, 2023

(65) Prior Publication Data

US 2024/0288868 A1 Aug. 29, 2024

Related U.S. Application Data

(63) Continuation of application No. 16/848,809, filed on Apr. 14, 2020, now Pat. No. 11,853,071, which is a
(Continued)

(51) Int. Cl.
*G05D 1/00* (2024.01)
*B62D 15/02* (2006.01)

(52) U.S. Cl.
CPC ....... *G05D 1/0221* (2013.01); *B62D 15/0255* (2013.01); *B62D 15/026* (2013.01); *B62D 15/0265* (2013.01); *G05D 1/0088* (2013.01)

(58) Field of Classification Search
CPC .............. B62D 15/0255; B62D 15/026; B62D 15/0265; B62D 15/025; G05D 1/0088; G05D 1/0221; G08G 1/166
See application file for complete search history.

(56) References Cited

U.S. PATENT DOCUMENTS 6,084,870 A 7/2000 Wooten et al.
6,263,088 B1 7/2001 Crabtree et al.
(Continued)

FOREIGN PATENT DOCUMENTS

CN 104882025 A 9/2015
CN 106340197 A 1/2017
(Continued)

OTHER PUBLICATIONS

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
(Continued)

*Primary Examiner* — Wade Miles
*Assistant Examiner* — Jerrod Irvin Davis
(74) *Attorney, Agent, or Firm* — Perkins Coie LLP

(57) ABSTRACT

A data-driven prediction-based system and method for trajectory planning of autonomous vehicles are disclosed. A particular embodiment includes: generating a first suggested trajectory for an autonomous vehicle; generating predicted resulting trajectories of proximate agents using a prediction module; scoring the first suggested trajectory based on the predicted resulting trajectories of the proximate agents; generating a second suggested trajectory for the autonomous vehicle and generating corresponding predicted resulting trajectories of proximate agents, if the score of the first suggested trajectory is below a minimum acceptable threshold; and outputting a suggested trajectory for the autonomous vehicle wherein the score corresponding to the suggested trajectory is at or above the minimum acceptable threshold.

18 Claims, 7 Drawing Sheets

Related U.S. Application Data continuation of application No. 15/698,607, filed on Sep. 7, 2017, now Pat. No. 10,649,458.

(56) References Cited

U.S. PATENT DOCUMENTS

| | | | |
|---|---|---|---|
| 6,594,821 | B1 | 7/2003 | Banning et al. |
| 6,777,904 | B1 | 8/2004 | Degner |
| 6,791,471 | B2 | 9/2004 | Wehner et al. |
| 6,975,923 | B2 | 12/2005 | Spriggs |
| 7,103,460 | B1 | 9/2006 | Breed |
| 7,689,559 | B2 | 3/2010 | Canright |
| 7,742,841 | B2 | 6/2010 | Sakai et al. |
| 7,783,403 | B2 | 8/2010 | Breed |
| 7,844,595 | B2 | 11/2010 | Canright |
| 8,041,111 | B1 | 10/2011 | Wilensky |
| 8,064,643 | B2 | 11/2011 | Stein |
| 8,082,101 | B2 | 12/2011 | Stein |
| 8,164,628 | B2 | 4/2012 | Stein |
| 8,175,376 | B2 | 5/2012 | Marchesotti |
| 8,265,850 | B2 | 9/2012 | Shin |
| 8,271,871 | B2 | 9/2012 | Marchesotti |
| 8,346,480 | B2 | 1/2013 | Trepagnier et al. |
| 8,378,851 | B2 | 2/2013 | Stein |
| 8,392,117 | B2 | 3/2013 | Dolgov |
| 8,401,292 | B2 | 3/2013 | Park |
| 8,412,449 | B2 | 4/2013 | Trepagnier |
| 8,428,820 | B2 | 4/2013 | Ottenhues et al. |
| 8,436,880 | B2 | 5/2013 | Matsushima et al. |
| 8,478,072 | B2 | 7/2013 | Aisaka |
| 8,553,088 | B2 | 10/2013 | Stein |
| 8,706,394 | B2 | 4/2014 | Trepagnier et al. |
| 8,718,861 | B1 | 5/2014 | Montemerlo et al. |
| 8,788,134 | B1 | 7/2014 | Litkouhi |
| 8,908,041 | B2 | 12/2014 | Stein |
| 8,917,169 | B2 | 12/2014 | Schofield |
| 8,963,913 | B2 | 2/2015 | Baek |
| 8,965,621 | B1 | 2/2015 | Urmson |
| 8,981,966 | B2 | 3/2015 | Stein |
| 8,983,708 | B2 | 3/2015 | Choe et al. |
| 8,993,951 | B2 | 3/2015 | Schofield |
| 9,002,632 | B1 | 4/2015 | Emigh |
| 9,008,369 | B2 | 4/2015 | Schofield |
| 9,025,880 | B2 | 5/2015 | Perazzi |
| 9,042,648 | B2 | 5/2015 | Wang |
| 9,081,385 | B1 | 7/2015 | Ferguson et al. |
| 9,088,744 | B2 | 7/2015 | Grauer et al. |
| 9,111,444 | B2 | 8/2015 | Kaganovich |
| 9,117,133 | B2 | 8/2015 | Barnes |
| 9,118,816 | B2 | 8/2015 | Stein |
| 9,120,485 | B1 | 9/2015 | Dolgov |
| 9,122,954 | B2 | 9/2015 | Srebnik |
| 9,134,402 | B2 | 9/2015 | Sebastian |
| 9,145,116 | B2 | 9/2015 | Clarke |
| 9,147,255 | B1 | 9/2015 | Zhang |
| 9,156,473 | B2 | 10/2015 | Clarke |
| 9,176,006 | B2 | 11/2015 | Stein |
| 9,179,072 | B2 | 11/2015 | Stein |
| 9,183,447 | B1 | 11/2015 | Gdalyahu |
| 9,185,360 | B2 | 11/2015 | Stein |
| 9,191,634 | B2 | 11/2015 | Schofield |
| 9,214,084 | B2 | 12/2015 | Grauer et al. |
| 9,219,873 | B2 | 12/2015 | Grauer et al. |
| 9,233,659 | B2 | 1/2016 | Rosenbaum |
| 9,233,688 | B2 | 1/2016 | Clarke |
| 9,248,832 | B2 | 2/2016 | Huberman |
| 9,248,834 | B1 | 2/2016 | Ferguson |
| 9,248,835 | B2 | 2/2016 | Tanzmeister |
| 9,251,708 | B2 | 2/2016 | Rosenbaum |
| 9,277,132 | B2 | 3/2016 | Berberian |
| 9,280,711 | B2 | 3/2016 | Stein |
| 9,282,144 | B2 | 3/2016 | Tebay et al. |
| 9,286,522 | B2 | 3/2016 | Stein |
| 9,297,641 | B2 | 3/2016 | Stein |
| 9,299,004 | B2 | 3/2016 | Lin |
| 9,315,192 | B1 | 4/2016 | Zhu |
| 9,317,033 | B2 | 4/2016 | Ibanez-guzman |
| 9,317,776 | B1 | 4/2016 | Honda |
| 9,330,334 | B2 | 5/2016 | Lin |
| 9,342,074 | B2 | 5/2016 | Dolgov |
| 9,347,779 | B1 | 5/2016 | Lynch |
| 9,355,635 | B2 | 5/2016 | Gao |
| 9,365,214 | B2 | 6/2016 | Ben Shalom |
| 9,399,397 | B2 | 7/2016 | Mizutani |
| 9,418,549 | B2 | 8/2016 | Kang et al. |
| 9,428,192 | B2 | 8/2016 | Schofield |
| 9,436,880 | B2 | 9/2016 | Bos |
| 9,438,878 | B2 | 9/2016 | Niebla |
| 9,443,163 | B2 | 9/2016 | Springer |
| 9,446,765 | B2 | 9/2016 | Ben Shalom |
| 9,459,515 | B2 | 10/2016 | Stein |
| 9,466,006 | B2 | 10/2016 | Duan |
| 9,476,970 | B1 | 10/2016 | Fairfield |
| 9,483,839 | B1 | 11/2016 | Kwon et al. |
| 9,490,064 | B2 | 11/2016 | Hirosawa |
| 9,494,935 | B2 | 11/2016 | Okumura et al. |
| 9,507,346 | B1 | 11/2016 | Levinson et al. |
| 9,513,634 | B2 | 12/2016 | Pack et al. |
| 9,531,966 | B2 | 12/2016 | Stein |
| 9,535,423 | B1 | 1/2017 | Debreczeni |
| 9,538,113 | B2 | 1/2017 | Grauer et al. |
| 9,547,985 | B2 | 1/2017 | Tuukkanen |
| 9,549,158 | B2 | 1/2017 | Grauer et al. |
| 9,555,803 | B2 | 1/2017 | Pawlicki |
| 9,568,915 | B1 | 2/2017 | Berntorp |
| 9,587,952 | B1 | 3/2017 | Slusar |
| 9,599,712 | B2 | 3/2017 | Van Der Tempel et al. |
| 9,600,889 | B2 | 3/2017 | Boisson et al. |
| 9,602,807 | B2 | 3/2017 | Crane et al. |
| 9,612,123 | B1 | 4/2017 | Levinson et al. |
| 9,620,010 | B2 | 4/2017 | Grauer et al. |
| 9,625,569 | B2 | 4/2017 | Lange |
| 9,628,565 | B2 | 4/2017 | Stenneth et al. |
| 9,632,502 | B1 | 4/2017 | Levinson et al. |
| 9,649,999 | B1 | 5/2017 | Amireddy et al. |
| 9,652,860 | B1 | 5/2017 | Maali et al. |
| 9,669,827 | B1 | 6/2017 | Ferguson et al. |
| 9,672,446 | B1 | 6/2017 | Vallespi-Gonzalez |
| 9,672,734 | B1 | 6/2017 | Ratnasingam |
| 9,690,290 | B2 | 6/2017 | Prokhorov |
| 9,691,286 | B2 | 6/2017 | Bahrami et al. |
| 9,701,023 | B2 | 7/2017 | Zhang et al. |
| 9,712,754 | B2 | 7/2017 | Grauer et al. |
| 9,718,466 | B2 | 8/2017 | Kim et al. |
| 9,720,418 | B2 | 8/2017 | Stenneth |
| 9,723,097 | B2 | 8/2017 | Harris |
| 9,723,099 | B2 | 8/2017 | Chen |
| 9,723,233 | B2 | 8/2017 | Grauer et al. |
| 9,726,754 | B2 | 8/2017 | Massanell et al. |
| 9,729,860 | B2 | 8/2017 | Cohen et al. |
| 9,738,280 | B2 | 8/2017 | Rayes |
| 9,739,609 | B1 | 8/2017 | Lewis |
| 9,746,550 | B2 | 8/2017 | Nath |
| 9,753,128 | B2 | 9/2017 | Schweizer et al. |
| 9,753,141 | B2 | 9/2017 | Grauer et al. |
| 9,754,490 | B2 | 9/2017 | Kentley et al. |
| 9,760,837 | B1 | 9/2017 | Nowozin et al. |
| 9,766,625 | B2 | 9/2017 | Boroditsky et al. |
| 9,769,456 | B2 | 9/2017 | You et al. |
| 9,773,155 | B2 | 9/2017 | Shotton et al. |
| 9,779,276 | B2 | 10/2017 | Todeschini et al. |
| 9,785,145 | B2 | 10/2017 | Gordon et al. |
| 9,785,149 | B2 | 10/2017 | Wang et al. |
| 9,805,294 | B2 | 10/2017 | Liu et al. |
| 9,810,785 | B2 | 11/2017 | Grauer et al. |
| 9,823,339 | B2 | 11/2017 | Cohen |
| 9,953,236 | B1 | 4/2018 | Huang et al. |
| 10,019,011 | B1 | 7/2018 | Green et al. |
| 10,037,699 | B1 | 7/2018 | Toyoda et al. |
| 10,133,275 | B1 | 11/2018 | Kobilarov et al. |
| 10,147,193 | B2 | 12/2018 | Huang et al. |
| 10,223,806 | B1 | 3/2019 | Luo et al. |
| 10,223,807 | B1 | 3/2019 | Luo et al. |
| 10,268,191 | B1 | 4/2019 | Lockwood et al. |
| 10,268,200 | B2 | 4/2019 | Fang et al. |

(56)                References Cited

U.S. PATENT DOCUMENTS

| | | |
|---|---|---|
| 10,410,055 B2 | 9/2019 | Wang et al. |
| 10,449,962 B2 | 10/2019 | Saigusa et al. |
| 10,564,638 B1 | 2/2020 | Lockwood et al. |
| 10,649,458 B2 | 5/2020 | Sun et al. |
| 11,892,846 B2 | 2/2024 | Zhang et al. |
| 2002/0121989 A1 | 9/2002 | Burns |
| 2003/0114980 A1 | 6/2003 | Klausner et al. |
| 2003/0174773 A1 | 9/2003 | Comaniciu et al. |
| 2007/0183661 A1 | 8/2007 | El-Maleh et al. |
| 2007/0183662 A1 | 8/2007 | Wang et al. |
| 2007/0230792 A1 | 10/2007 | Shashua |
| 2007/0286526 A1 | 12/2007 | Abousleman et al. |
| 2008/0249667 A1 | 10/2008 | Horvitz |
| 2009/0040054 A1 | 2/2009 | Wang |
| 2009/0087029 A1 | 4/2009 | Coleman et al. |
| 2010/0049397 A1 | 2/2010 | Lin |
| 2010/0111417 A1 | 5/2010 | Ward et al. |
| 2010/0226564 A1 | 9/2010 | Marchesotti |
| 2010/0256836 A1 | 10/2010 | Mudalige |
| 2010/0281361 A1 | 11/2010 | Marchesotti |
| 2011/0071731 A1 | 3/2011 | Eidehall et al. |
| 2011/0142283 A1 | 6/2011 | Huang et al. |
| 2011/0190972 A1 | 8/2011 | Timmons et al. |
| 2011/0206282 A1 | 8/2011 | Aisaka |
| 2011/0247031 A1 | 10/2011 | Jacoby |
| 2012/0041636 A1 | 2/2012 | Johnson et al. |
| 2012/0105639 A1 | 5/2012 | Stein |
| 2012/0140076 A1 | 6/2012 | Rosenbaum |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko et al. |
| 2013/0182134 A1 | 7/2013 | Grundmann et al. |
| 2013/0204465 A1 | 8/2013 | Phillips et al. |
| 2013/0266187 A1 | 10/2013 | Bulan et al. |
| 2013/0329052 A1 | 12/2013 | Chew |
| 2014/0072170 A1 | 3/2014 | Zhang et al. |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa |
| 2014/0198184 A1 | 7/2014 | Stein |
| 2014/0207325 A1 | 7/2014 | Mudalige |
| 2014/0253722 A1 | 9/2014 | Smyth |
| 2014/0303883 A1 | 10/2014 | Aso |
| 2014/0321704 A1 | 10/2014 | Partis |
| 2014/0334668 A1 | 11/2014 | Saund |
| 2015/0046060 A1 | 2/2015 | Nikovski et al. |
| 2015/0062304 A1 | 3/2015 | Stein |
| 2015/0266390 A1 | 9/2015 | Shin et al. |
| 2015/0310370 A1 | 10/2015 | Burry et al. |
| 2015/0353082 A1 | 12/2015 | Lee |
| 2016/0026787 A1 | 1/2016 | Nairn et al. |
| 2016/0037064 A1 | 2/2016 | Stein |
| 2016/0094774 A1 | 3/2016 | Li |
| 2016/0118080 A1 | 4/2016 | Chen |
| 2016/0129907 A1 | 5/2016 | Kim |
| 2016/0165157 A1 | 6/2016 | Stein |
| 2016/0176398 A1 | 6/2016 | Prokhorov |
| 2016/0210528 A1 | 7/2016 | Duan |
| 2016/0275766 A1 | 9/2016 | Venetianer et al. |
| 2016/0314687 A1 | 10/2016 | Koshizen |
| 2016/0321381 A1 | 11/2016 | English |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0008519 A1 | 1/2017 | Vijayan |
| 2017/0010618 A1 | 1/2017 | Shashua et al. |
| 2017/0053169 A1 | 2/2017 | Cuban et al. |
| 2017/0120926 A1 | 5/2017 | Yoon |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0210378 A1 | 7/2017 | Gunaratne |
| 2017/0248960 A1 | 8/2017 | Shashua et al. |
| 2017/0301104 A1 | 10/2017 | Qian et al. |
| 2017/0305423 A1 | 10/2017 | Green |
| 2018/0141544 A1 | 5/2018 | Xiao et al. |
| 2018/0151063 A1 | 5/2018 | Pun et al. |
| 2018/0158197 A1 | 6/2018 | Dasgupta et al. |
| 2018/0260956 A1 | 9/2018 | Huang et al. |
| 2018/0283892 A1 | 10/2018 | Behrendt et al. |
| 2018/0286258 A1 | 10/2018 | Derbanne |
| 2018/0326982 A1* | 11/2018 | Paris ............... B60W 30/18154 |
| 2018/0341269 A1 | 11/2018 | Lv et al. |
| 2018/0354518 A1 | 12/2018 | Inou et al. |
| 2018/0373980 A1 | 12/2018 | Huval |
| 2018/0374341 A1 | 12/2018 | Branson et al. |
| 2018/0374359 A1 | 12/2018 | Li et al. |
| 2019/0016339 A1 | 1/2019 | Ishioka |
| 2019/0025841 A1 | 1/2019 | Haynes et al. |
| 2019/0025853 A1 | 1/2019 | Julian et al. |
| 2019/0034794 A1 | 1/2019 | Ogale et al. |
| 2019/0049987 A1 | 2/2019 | Djuric et al. |
| 2019/0065863 A1 | 2/2019 | Luo et al. |
| 2019/0066329 A1 | 2/2019 | Luo et al. |
| 2019/0066330 A1 | 2/2019 | Luo et al. |
| 2019/0072965 A1 | 3/2019 | Zhang et al. |
| 2019/0072966 A1 | 3/2019 | Zhang et al. |
| 2019/0072973 A1 | 3/2019 | Sun et al. |
| 2019/0079526 A1 | 3/2019 | Vallespi-Gonzalez et al. |
| 2019/0108384 A1 | 4/2019 | Wang et al. |
| 2019/0129436 A1 | 5/2019 | Sun et al. |
| 2019/0132391 A1 | 5/2019 | Thomas et al. |
| 2019/0132392 A1 | 5/2019 | Liu et al. |
| 2019/0210564 A1 | 7/2019 | Han et al. |
| 2019/0210613 A1 | 7/2019 | Sun et al. |
| 2019/0236950 A1 | 8/2019 | Li et al. |
| 2019/0266420 A1 | 8/2019 | Ge et al. |
| 2019/0325325 A1 | 10/2019 | Monteil et al. |
| 2020/0241546 A1 | 7/2020 | Sun et al. |

FOREIGN PATENT DOCUMENTS

| | | |
|---|---|---|
| CN | 106384540 A | 2/2017 |
| CN | 106781591 A | 5/2017 |
| CN | 108010360 A | 5/2018 |
| DE | 2608513 A1 | 9/1977 |
| EP | 1754179 A1 | 2/2007 |
| EP | 2448251 A2 | 5/2012 |
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| KR | 100802511 B1 | 2/2008 |
| WO | 2005098782 A1 | 10/2005 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | 2013045612 A1 | 4/2013 |
| WO | WO/2013/045612 | 4/2013 |
| WO | WO/2014/111814 A2 | 7/2014 |
| WO | WO/2014/111814 A3 | 7/2014 |
| WO | 2014166245 A1 | 10/2014 |
| WO | 2014201324 A1 | 12/2014 |
| WO | WO/2014/201324 | 12/2014 |
| WO | 2015083009 A1 | 6/2015 |
| WO | WO/2015/083009 | 6/2015 |
| WO | WO/2015/103159 A1 | 7/2015 |
| WO | 2015125022 A2 | 8/2015 |
| WO | WO/2015/125022 | 8/2015 |
| WO | WO/2015/186002 A2 | 12/2015 |
| WO | WO/2015/186002 A3 | 12/2015 |
| WO | 2016090282 A1 | 6/2016 |
| WO | 2016135736 A2 | 9/2016 |
| WO | WO/2016/135736 | 9/2016 |
| WO | WO/2017/013875 A1 | 1/2017 |
| WO | 2017079349 A1 | 5/2017 |

(56)　　　　　References Cited

FOREIGN PATENT DOCUMENTS

| | | |
|---|---|---|
| WO | 2017079460 A2 | 5/2017 |
| WO | 2017094849 A1 | 6/2017 |
| WO | 2017095614 A1 | 6/2017 |
| WO | WO2017120336 A2 | 7/2017 |
| WO | 2018094374 A1 | 5/2018 |
| WO | 2019040800 A1 | 2/2019 |
| WO | WO2019060927 A2 | 3/2019 |
| WO | 2019084491 A1 | 5/2019 |
| WO | 2019084494 A1 | 5/2019 |
| WO | 2019140277 A2 | 7/2019 |
| WO | 2019168986 A1 | 9/2019 |

OTHER PUBLICATIONS

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampaliii, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision". arXiv:1703.04977v1 [cs.CV] Mar. 15, 2017.

Wei, Junqing, John M. Dolan, Bakhtiar Litkhouhi, "A Prediction-and Cost Function-Based Algorithm for Robust Autonomous Freeway Driving", 2010 IEEE Intelligent Vehicles Symposium, University of California, San Diego, CA, USA, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, institute of Automation, Chinese Academy of Sciences, China, arXiv:1611.09580v1 [cs.CV] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.

Adhiraj Somani, Nan Ye, David Hsu, and Wee Sun Lee, "DESPOT: Online POMDP Planning with Regularization", Department of Computer Science, National University of Singapore, date unknown.

Adam Paszke, Abhishek Chaurasia, Sangpil Kim, and Eugenio Culurciello. Enet: A deep neural network architecture for real-time semantic segmentation. CoRR, abs/1606.02147, 2016.

PCT International Search Report and Written Opinion, International Appl. No. PCT/US18/59689, International filing date Nov. 7, 2018, mailing date Apr. 24, 2019.

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching For Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Sallency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

(56) References Cited

OTHER PUBLICATIONS

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

Ducher, Alban. European Application No. 18854601.4, European Exam Report Mailed Mar. 23, 2022, pp. 1-5.

Ducher, Alban. European Application No. 18854601.4, European Exam Report Mailed Nov. 18, 2022, pp. 1-5.

Chinese Application No. 201880058298.8, Notice of Decision to Grant Mailed Jul. 27, 2022, pp. 1-2.

Chinese Application No. 201880058298.8, Office Action Mailed Feb. 8, 2022, pp. 1-14.

Ducher, Alban. European Application No. 18854601.4, Extended European Search Report Mailed Apr. 13, 2021, pp. 1-9.

Rameau, Pascal. European Application No. 19788382.0, Extended European Search Report Mailed Nov. 2, 2021, pp. 1-11.

Chaudhari, Pratick et al. "Incremental minimum-violating control synthesis for robots interacting with external agents" 2015 American Control Conference (ACC), IEEE, Jun. 4, 2014, pp. 1761-1768.

Office Action from corresponding Chinese Application No. 2018800584860, dated Jan. 28, 2023.

Search Report from corresponding Chinese Application No. 2018800584860, dated Jan. 15, 2023.

Examination Report from corresponding EuropeanAustralian Patent Application No. 2018330031, dated Dec. 15, 2022 (5 pages).

International Preliminary Report on Patentability, International Application No. PCT/2018/059689, Mailed Mar. 10, 2020., Mar. 10, 2020.

PCT International Search Report and Written Opinion, International Application No. PCT/US2018/059689, Mailed Apr. 24, 2019., Apr. 24, 2019.

Ahn, Kyoungho , et al., "The Effects of Route Choice Decisions on Vehicle Energy Consumption and Emissions", Virginia Tech Transportation Institute, date unknown.

Athanasiadis, Thanos , et al., "Semantic Image Segmentation and Object Labeling", IEEE Transactions on Circuits and Systems for Video Technology, vol. 17, No. 3, Mar. 2007., Mar. 2007.

Barth, Matthew , et al., "Recent Validation Efforts for a Comprehensive Modal Emissions Model", Transportation Research Record 1750, Paper No. 01-0326, College of Engineering, Center for Environmental Research and Tech., University of California Riverside.

Cordts, Marius , et al., "The Cityscapes Dataset for Semantic Urban Scene Understanding", Proceedings of the IEEE Computer Society Conference on Computer Vision and Pattern Recognition (CVPR), Las Vegas, Nevada, 2016., 2016.

Dai, Jifeng , et al., "Instance-aware Semantic Segmentation via Multi-task Network Cascades", CVPR 2016., 2016.

Guarneri, Paolo , et al., "A Neural-Network Based Model for the Dynamic Simulation of the Tire/Suspension System While Traversing Road Irregularities", IEEE Transactions on Neural Networks, vol. 19, No. 9, pp. 1549-1563, Sep. 2008., Sep. 2008, pp. 1549-1563.

Hou, Xiaodi , et al., "A Meta-Theory of Boundary Detection Benchmarks", arXiv Preprint arXiv: 1302.5985, 2013., 2013.

Hou, Xiaodi , et al., "A Time-Dependent Model of Information Capacity of Visual Attention", International Conference on Neural Information Processing, pp. 127-136, Springer Berlin Heidelberg, 2006., 2006, pp. 127-136.

Hou, Xiaodi , et al., "Boundary Detection Benchmarking: Beyond F-Measures", Computer Vision and Pattern Recognition, CVPR'13, vol. 2013, pp. 1-8, IEEE, 2013., pp. 1-8.

Hou, Xiaodi , et al., "Color Conceptualization", Proceedings of the 15th ACM International Conference on Multimedia, pp. 265-268, ACM, 2007., 2007, pp. 265-268.

Hou, Xiaodi , "Computational Modeling and Psychophysics in Low and Mid-Level Vision", California Institute of Technology, 2014., 2014.

Hou, Xiaodi , et al., "Dynamic Visual Attention: Searching for Coding Length Increments", Advances in Neural Information Processing Systems, vol. 21, pp. 681-688, 2008., 2008, pp. 681-688.

Hou, Xiaodi , et al., "Image Signature: Highlighting Sparse Salient Regions", IEEE Transactions on Pattern Analysis and Machine Intelligence, vol. 34, No. 1, pp. 194-201, 2012., 2012, pp. 194-201.

Hou, Xiaodi , et al., "Saliency Detection: A Spectral Residual Approach", Computer Vision and Pattern Recognition, CVPR'07—IEEE Conference, pp. 1-8, 2007, 2007, pp. 1-8.

Hou, Xiaodi , et al., "Thumbnail Generation Based on Global Saliency", Advances in Cognitive Neurodynamics, ICCN 2007, pp. 999-1003, Springer Netherlands, 2008., 2008, 999-1003.

Huval, Brody , et al., "An Empirical Evaluation of Deep Learning on Highway Driving", arXiv: 1504.01716v3 [cs.RO], Apr. 17, 2015., Apr. 17, 2015.

Jain, Suyong Dutt , et al., "Active Image Segmentation Propagation", In Proceedings of the IEEE Conference on Computer Vision and Pattern Recognition (CVPR), Las Vegas, Jun. 2016., Jun. 2016.

Kendall, Alex , et al., "What Uncertainties Do We Need in Bayesian Deep Learning for Computer Vision", arXiv: 1703.04977v1 [csCV], Mar. 15, 2017., Mar. 15, 2017.

Li, Yanghao , et al., "Demystifying Neural Style Transfer", arXiv preprint arXiv: 1701.01036, 2017., 2017.

Li, Yanghao , et al., "Factorized Bilinear Models for Image Recognition", arXiv preprint arXiv: 1611.05709, 2016., 2016.

Li, Tian , "Proposal Free Instance Segmentation Based on Instance-aware Metric", Department of Computer Science, Cranberry-Lemon University, Pittsburgh, PA, date unknown.

Li, Yanghao , et al., "Revisiting Batch Normalization for Practical Domain Adaptation", arXiv preprint arXiv: 1603.04779, 2016., 2016.

Li, Yin , et al., "The Secrets of Salient Object Segmentation", Proceedings of the IEEE Conference on Computer Vision and Pattern Recognition, pp. 280-287, 2014., 2014, pp. 280-287.

Macaodha, Oisin , et al., "Hierarchical Subquery Evaluation for Active Learning on a Graph", In Proceedings of the IEEE Conference on Computer Vision and Pattern Recognition (CVPR), 2014., 2014.

Norouzi, Mohammad , et al., "Hamming Distance Metric Learning", Departments of Computer Science and Statistics, University of Toronto, date unknown.

Paszke, Adam , et al., "Enet: A Deep Neural Network Architecture for Real-Time Semantic Segmentation", CoRR, abs/1606.02147, 2016., 2016.

Ramos, Sebastian , et al., "Detecting Unexpected Obstacles for Self-Driving Cars: Fusing Deep Learning and Geometric Modeling", arXiv: 1612.06573v1 [cs.CV], Dec. 20, 2016., Dec. 20, 2016.

Richter, Stephan R, et al., "Playing for Data: Ground Truth from Computer Games", Intel Labs, European Conference on Computer Vision (ECCV), Amsterdam, Netherlands, 2016., 2016.

Schroff, Florian , et al., "FaceNet: A Unified Embedding for Face Recognition and Clustering", CVPR 2015., 2015.

Somani, Adhiraj , et al., "DESPOT: Online POMDP Planning with Regularization", Department of Computer Science, National University of Singapore, date unknown.

Spinello, Luciano , et al., "Multiclass Multimodal Detection and Tracking in Urban Environments", Sage Journals, vol. 29, Issue: 12, pp. 1498-1515, Oct. 1, 2010., Oct. 1, 2010, pp. 1498-1515.

Szeliski, Richard , "Computer Vision: Algorithms and Applications", http://szeliski.org/book, 2010., 2010.

Wang, Panqu , et al., "Understanding Convolution for Semantic Segmentation", arXiv preprint arXiv: 1702.08502, 2017., 2017.

Wei, Junqing , et al., "A Prediction- and Cost Function-Based Algorithm for Robust Autonomous Freeway Driving", 2010 IEEE Intelligent Vehicles Symposium, University of California, San Diego, CA, USA, Jun. 21-24, 2010., Jun. 21, 2010.

Welinder, Peter , et al., "The Multidimensional Wisdom of Crowds", http://www.vision.caltech.edu/visipedia/papers/WelinderEtalNIPS. pdf, 2010., 2010.

Yang, C. , et al., "Neural Network-Based Motion Control of an Underactuated Wheeled Inverted Pendulum Model", IEEE Transaction on Neural Networks and Learning Systems, vol. 25, No. 11, pp. 2004-2016, Nov. 2014., Nov. 2014, pp. 2004-2016.

(56)  References Cited

OTHER PUBLICATIONS

Yu, Kai , et al., "Large-scale Distributed Video Parsing and Evaluation Platform", Center for Research on Intelligent Perception and Computing, Institute of Automation, Chinese Academy of Sciences, China, arXiv: 1611.09580v1 [cs.CV], Nov. 29, 2016., Nov. 29, 2016.

Zhou, Bolei , et al., "A Phase Discrepancy Analysis of Object Motion", Asian Conference on Computer Vision, pp. 225-238, Springer Berlin Heidelberg, 2010., 2010, pp. 225-238.

Australian Patent Office; Examination Report No. 1 pursuant to section 45 of the Patents Act 1990 for Australian Patent Application No. 2023266229, mailed on Aug. 9, 2024; 4 pages.

* cited by examiner

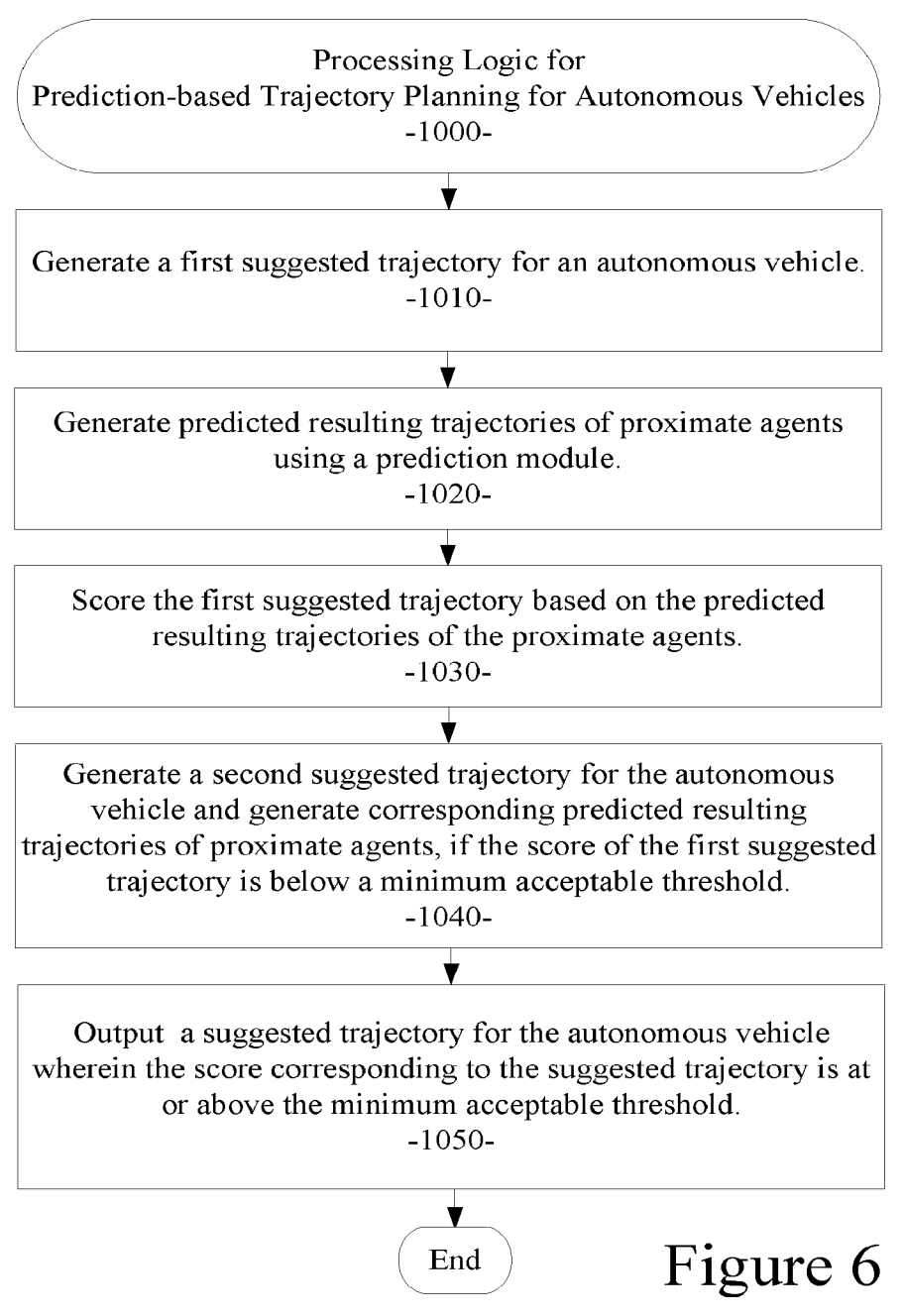

Processing Logic for
Prediction-based Trajectory Planning for Autonomous Vehicles
-1000-

Generate a first suggested trajectory for an autonomous vehicle.
-1010-

Generate predicted resulting trajectories of proximate agents
using a prediction module.
-1020-

Score the first suggested trajectory based on the predicted
resulting trajectories of the proximate agents.
-1030-

Generate a second suggested trajectory for the autonomous
vehicle and generate corresponding predicted resulting
trajectories of proximate agents, if the score of the first suggested
trajectory is below a minimum acceptable threshold.
-1040-

Output a suggested trajectory for the autonomous vehicle
wherein the score corresponding to the suggested trajectory is at
or above the minimum acceptable threshold.
-1050-

End

Figure 6

DATA-DRIVEN PREDICTION-BASED SYSTEM AND METHOD FOR TRAJECTORY PLANNING OF AUTONOMOUS VEHICLES

CROSS-REFERENCE TO RELATED APPLICATIONS

This patent document is a continuation of U.S. patent application Ser. No. 16/848,809, filed on Apr. 14, 2020, which is a continuation of and claims the benefit of and priority to U.S. patent application Ser. No. 15/698,607, filed on Sep. 7, 2017. The aforementioned applications of which are incorporated herein by reference in their entireties.

TECHNICAL FIELD

This patent document pertains generally to tools (systems, apparatuses, methodologies, computer program products, etc.) for trajectory planning, vehicle control systems, and autonomous driving systems, and more particularly, but not by way of limitation, to a data-driven prediction-based system and method for trajectory planning of autonomous vehicles.

COPYRIGHT NOTICE

BACKGROUND

An autonomous vehicle is often configured to follow a trajectory based on a computed driving path. However, when variables such as obstacles are present on the driving path, the autonomous vehicle must perform control operations so that the vehicle may be safely driven by changing the driving path to avoid the obstacles.

In the related art, autonomous vehicle control operations have been determined by representing spatial information (e.g., a coordinate, a heading angle, a curvature, etc.) of the driving path as a polynomial expression or mathematical function for a movement distance in order to avoid a stationary obstacle. However, when dynamic obstacles are present on the driving path, the autonomous vehicle according to the related art may not accurately predict whether or not the vehicle will collide with the dynamic obstacles. In particular, the related art does not consider the interaction between the autonomous vehicle and other dynamic vehicles. Therefore, conventional autonomous vehicle control systems cannot accurately predict the future positions of other proximate dynamic vehicles. As a result, the optimal behavior of the conventional autonomous vehicle cannot be achieved. For example, the unexpected behavior of a proximate dynamic obstacle may result in a collision with the conventional autonomous vehicle.

SUMMARY

A system and method for providing trajectory planning of autonomous vehicles is disclosed herein. Specifically, the present disclosure relates generally to trajectory planning for autonomous vehicles using a data-driven prediction-based method. In one aspect, the system herein may include various sensors, configured to collect data, a computing device, and a prediction module for predicting trajectory of other vehicles and/or dynamic objects in the vicinity of the autonomous vehicle. Initially, the computing device generates a trajectory option, while the prediction module predicts reactions of vehicles and/or dynamic objects examined using data concerning likely trajectories of each vehicle and/or dynamic objects respectively. Data corresponding to predicted reaction can be sent to the computing device to perfect the trajectory option suggested initially. The computing device may subsequently instruct the prediction module to further collect data and conduct predictions to complete the trajectory planning process.

BRIEF DESCRIPTION OF THE DRAWINGS

The various embodiments are illustrated by way of example, and not by way of limitation, in the figures of the accompanying drawings in which:

FIG. 6 is a process flow diagram illustrating an example embodiment of a data-driven prediction-based system and method for trajectory planning of autonomous vehicles.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a data-driven prediction-based system and method for trajectory planning of autonomous vehicles are described herein. An example embodiment disclosed herein can be used in the context of an in-vehicle control system 150 in a vehicle ecosystem 101. In one example embodiment, an in-vehicle control system 150 with a prediction-based trajectory planning module 200 resident in a vehicle 105 can be configured like the architecture and ecosystem 101 illustrated in FIG. 1. However, it will be apparent to those of ordinary skill in the art that the prediction-based trajectory planning module 200 described and claimed herein can be implemented, configured, and used in a variety of other applications and systems as well.

Figure 1:
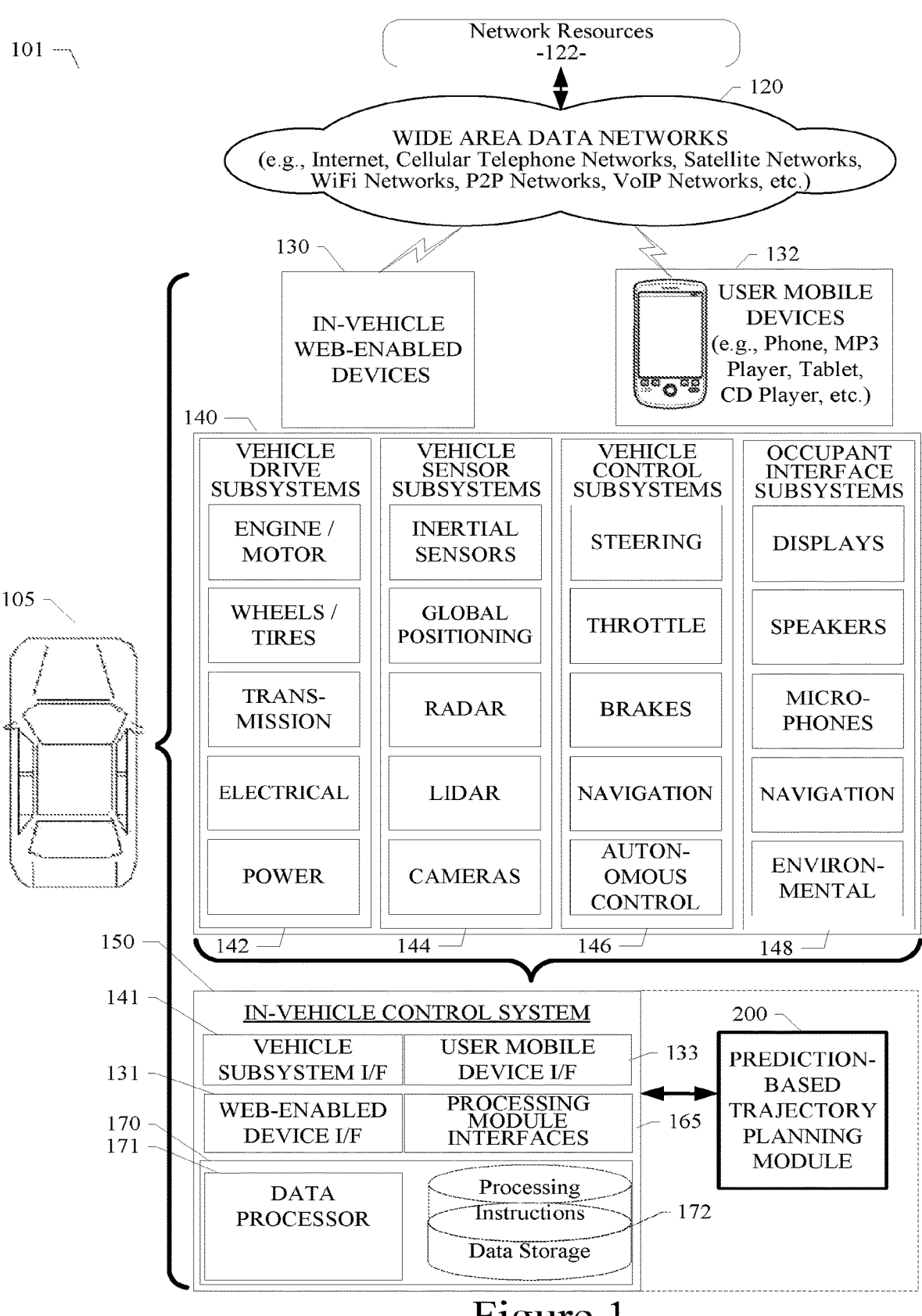
FIG. 1 illustrates a block diagram of an example ecosystem in which a prediction-based trajectory planning module of an example embodiment can be implemented.

Referring now to FIG. 1, a block diagram illustrates an example ecosystem 101 in which an in-vehicle control system 150 and a prediction-based trajectory planning module 200 of an example embodiment can be implemented. These components are described in more detail below. Ecosystem 101 includes a variety of systems and components that can generate and/or deliver one or more sources of information/data and related services to the in-vehicle control system 150 and the prediction-based trajectory planning module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and an image processing module executing therein can receive this image and timing data input. The image processing module can extract object data from the image and timing data to identify objects in the proximity of the vehicle. As described in more detail below, the prediction-based trajectory planning module 200 can process the object data and generate a trajectory for the vehicle based on the detected objects. The trajectory can be used by an autonomous vehicle control subsystem, as another one of the subsystems of vehicle subsystems 140. The autonomous vehicle control subsystem, for example, can use the real-time generated trajectory to safely and efficiently navigate the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the prediction-based trajectory planning module 200 for processing object data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the prediction-based trajectory planning module 200. In various example embodiments, a plurality of processing modules, configured similarly to prediction-based trajectory planning module 200, can be provided for execution by data processor 171. As shown by the dashed lines in FIG. 1, the prediction-based trajectory planning module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VOIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing object input or object input analysis. Antennas can serve to connect the in-vehicle control system 150 and the prediction-based trajectory planning module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VOIP) networks, and the like are also well-known. Thus, as described in more detail below, the in-vehicle control system 150 and the prediction-based trajectory planning module 200 can receive web-based data or content via an in-vehicle web-enabled device interface 131, which can be used to connect with the in-vehicle web-enabled device receiver 130 and network 120. In this manner, the in-vehicle control system 150 and the prediction-based trajectory planning module 200 can support a variety of network-connectable in-vehicle devices and systems from within a vehicle 105.

As shown in FIG. 1, the in-vehicle control system 150 and the prediction-based trajectory planning module 200 can also receive data, object processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, object processing control parameters, and content for the in-vehicle control system 150 and the prediction-based trajectory planning module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the prediction-based trajectory planning module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the prediction-based trajectory planning module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source.

The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the prediction-based trajectory planning module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the prediction-based trajectory planning module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/ occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 140, the vehicle sensor subsystem 144, the vehicle control subsystem 146, and the occupant interface subsystems 148.

In addition to the processing instructions, the data storage device 172 may store data such as object processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 140, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and follow a path or trajectory generated by the prediction-based trajectory planning module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and prediction-based trajectory planning module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the prediction-based trajectory planning module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the prediction-based trajectory planning module 200 can be implemented as in-vehicle components of vehicle 105. In various example embodiments, the in-vehicle control system 150 and the prediction-based trajectory planning module 200 in data communication therewith can be implemented as integrated components or as separate components. In an example embodiment, the software components of the in-vehicle control system 150 and/or the prediction-based trajectory planning module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Figure 2:
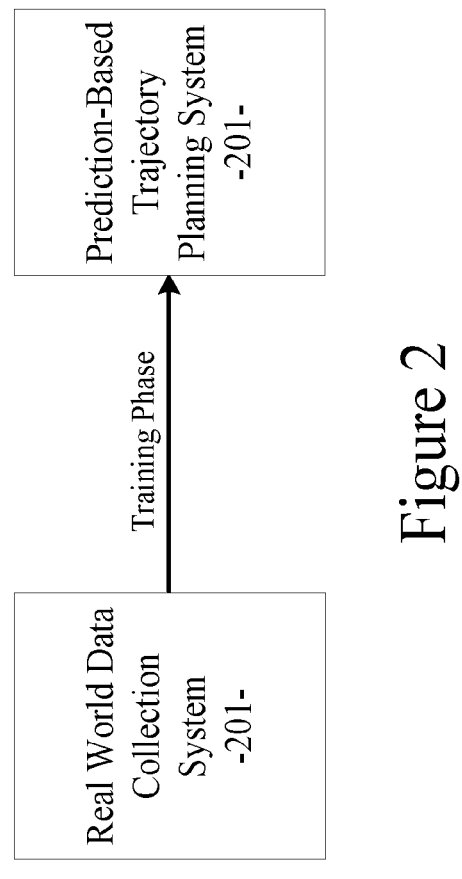
FIG. 2 illustrates a training phase for training and building a prediction-based trajectory planning system in an example embodiment.

As described in various example embodiments, a data-driven prediction-based system and method for trajectory planning of autonomous vehicles are described herein. Referring now to FIG. 2, an example embodiment disclosed herein can be used in the context of a prediction-based trajectory planning system 202 for autonomous vehicles. In particular, the real world data collection system 201 can be used to train or configure processing parameters for the prediction-based trajectory planning system 202. As described in more detail below for an example embodiment, the prediction-based trajectory planning system 202 can generate vehicle trajectories based object data 210 provided to the prediction-based trajectory planning system 202 and based on the training the prediction-based trajectory planning system 202 receives from the data collection system 201. The data collection system 201 can include an array of perception information gathering devices or sensors that may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, and the like. The perception information gathered by the information gathering devices at various traffic locations can include traffic or vehicle image data, roadway data, environmental data, distance data from LIDAR or radar devices, and other sensor information received from the information gathering devices of the data collection system 201 positioned adjacent to particular roadways (e.g., monitored locations). Additionally, the data collection system 201 can include information gathering devices installed in moving test vehicles being navigated through pre-defined routings in an environment or location of interest. The perception information can include data from which a position and velocity of neighboring vehicles in the vicinity of or proximate to the autonomous vehicle can be obtained or calculated. Corresponding ground truth data can also be gathered by the data collection system 201.

The real world data collection system 201 can collect actual trajectories of vehicles and corresponding ground truth data under different scenarios and different driver intentions. The different scenarios can correspond to different locations, different traffic patterns, different environmental conditions, and the like. The scenarios can be represented, for example, by an occupancy grid, a collection of vehicle states on a map, or a graphical representation, such as a top-down image of one or more areas of interest. The driver intentions can correspond to a driver's short term driving goals, such as merging to a ramp, making right turn at an intersection, making a U-turn, and the like. The driver intentions can also correspond to a set of driver or vehicle control actions to accomplish a particular short term driving goal.

The image data and other perception data and ground truth data collected by the data collection system 201 reflects truly realistic, real-world traffic information related to the locations or routings, the scenarios, and the driver intentions being monitored. Using the standard capabilities of well-known data collection devices, the gathered traffic and vehicle image data and other perception or sensor data can be wirelessly transferred (or otherwise transferred) to a data processor of a standard computing system, upon which the real world data collection system 201 can be executed. Alternatively, the gathered traffic and vehicle image data and other perception or sensor data can be stored in a memory device at the monitored location or in the test vehicle and transferred later to the data processor of the standard computing system. The traffic and vehicle image data and other perception or sensor data, the ground truth data and the driver intention data gathered or calculated by the real world data collection system 201 can be used to generate training data, which can be processed by the prediction-based trajectory planning system 202 in a training phase. For example, as well-known, neural networks can be trained to produce configured output based on training data provided to the neural network or other machine learning system in a training phase. The training data provided by the real world data collection system 201 can be used to train the prediction-based trajectory planning system 202 to build a generative prediction model (prediction module 175 shown in FIG. 3) that can predict vehicles' future trajectories given their current context and the training received during the training phase. As a result, the prediction-based trajectory planning system 202 can use the machine learning training provided by the real world data collection system 201 in the training phase and the real-world object data 210 to create corresponding vehicle or object trajectories in a data-driven prediction model. As a result, the example embodiments use the real world data collection system 201 to collect data corresponding to human driving behaviors and then use the prediction-based trajectory planning system 202 to generate predicted vehicle trajectories based on the human driving behaviors. Additionally, example embodiments can use a loss function to examine and correct the results of the training provided to the prediction-based trajectory planning system 202 by the real world data collection system 201.

In an example embodiment, the processing performed by the prediction-based trajectory planning system 202 can be divided into two stages: an offline training phase, and an operational phase. In the offline training phase, the processed data provided by the real world data collection system 201 can be used to train the prediction-based trajectory planning system 202, which can build the trajectory prediction module 175 (shown in FIG. 3), the use of which is described in more detail below. In an example embodiment, the prediction module 175 can be implemented as a neural network, which can be trained using the processed data provided by the real world data collection system 201. As a result, the prediction module 175 can be trained to simulate or predict the behavior and trajectories of vehicles with drivers in a real-world scenario based on the processed data provided by the real world data collection system 201. Because the prediction module 175 is trained using real world, human behavior data, the predicted behavior and trajectories of vehicles produced by the prediction module 175 is closely correlated to the actual behavior and trajectories of vehicles in a real world environment with human drivers and based on a human driver behavior model.

After the prediction module 175 is trained in the training phase as described above, the prediction module 175 can be deployed in an operational phase of the prediction-based trajectory planning system 202. In the operational phase, the prediction-based trajectory planning system 202 can generate predicted vehicle trajectories based on a human driver behavior model as described above. The operational phase of the prediction-based trajectory planning system 202 is described in more detail below.

As a result of the processing performed by the prediction-based trajectory planning system 202, data corresponding to predicted or simulated driver behaviors and predicted or simulated vehicle trajectories can be produced and fed back into the prediction-based trajectory planning system 202 to improve the accuracy of the predicted trajectories. A loss calculation can be performed for this purpose. Ultimately, the improved prediction-based trajectory planning system 202 can be used to provide highly accurate predicted traffic trajectory information to a user or for configuration of a control system of an autonomous vehicle. In particular, the predicted or simulated traffic trajectory information can be provided to a system component used to create a virtual world where a control system for an autonomous vehicle can be trained and improved. The virtual world is configured to be identical (as possible) to the real world where vehicles are operated by human drivers. In other words, the predicted or simulated traffic trajectory information generated by the prediction-based trajectory planning system 202 is directly and indirectly useful for configuring the control systems for an autonomous vehicle. It will be apparent to those of ordinary skill in the art that the prediction-based trajectory planning system 202 and the predicted or simulated traffic trajectory information described and claimed herein can be implemented, configured, processed, and used in a variety of other applications and systems as well.

Figure 3:
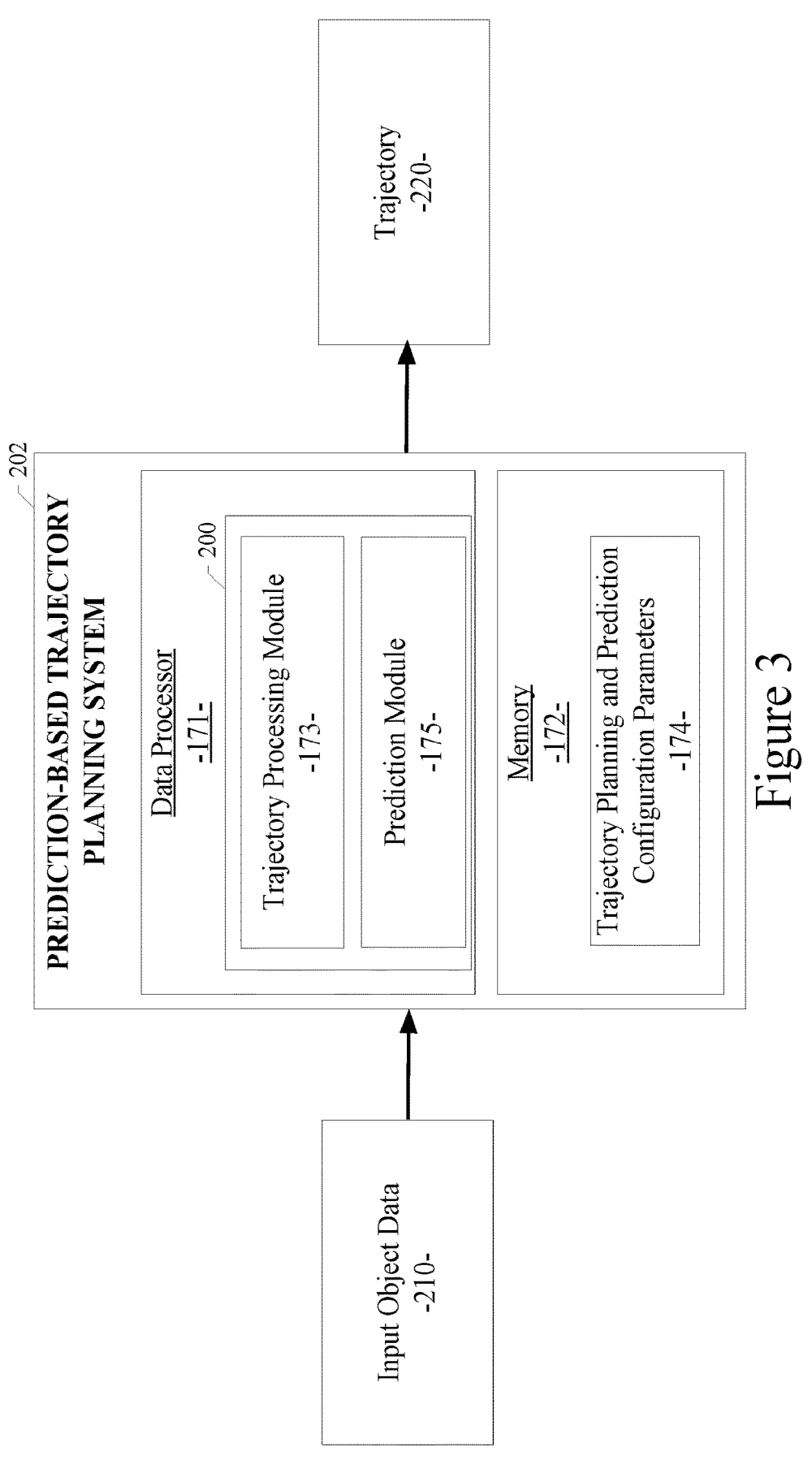
FIGS. 3 and 4 illustrate the components of the prediction-based trajectory planning system of an example embodiment.

Referring now to FIG. 3, a diagram illustrates an example embodiment of the components of the prediction-based trajectory planning system 202 and the prediction-based trajectory planning module 200 therein. In the example embodiment, the prediction-based trajectory planning module 200 can be configured to include a trajectory processing module 173 and the prediction module 175. As described in more detail below, the trajectory processing module 173 and the prediction module 175 serve to enable generation of a trajectory for the vehicle based on input object data 210 received from one or more of the vehicle sensor subsystems 144, including one or more cameras, and processed by an image processing module to identify proximate agents (e.g., moving vehicles, dynamic objects, or other objects in the proximate vicinity of the vehicle). The generated vehicle trajectories are also based on the training of the prediction module 175 in the human driver behavior model by the real world data collection system 201 as described above. The trajectory processing module 173 and the prediction module 175 can be configured as software modules executed by the data processor 171 of the in-vehicle control system 150. The modules 173 and 175 of the prediction-based trajectory planning module 200 can receive the input object data 210 and produce a trajectory 220, which can be used by the autonomous control subsystem of the vehicle control subsystem 146 to more efficiently and safely control the vehicle 105. As part of their trajectory planning processing, the trajectory processing module 173 and the prediction module 175 can be configured to work with trajectory planning and prediction configuration parameters 174, which can be used to customize and fine tune the operation of the prediction-based trajectory planning module 200. The trajectory planning and prediction configuration parameters 174 can be stored in a memory 172 of the in-vehicle control system 150.

In the example embodiment, the prediction-based trajectory planning module 200 can be configured to include an interface with the in-vehicle control system 150, as shown in FIG. 1, through which the prediction-based trajectory planning module 200 can send and receive data as described herein. Additionally, the prediction-based trajectory planning module 200 can be configured to include an interface with the in-vehicle control system 150 and/or other ecosystem 101 subsystems through which the prediction-based trajectory planning module 200 can receive ancillary data from the various data sources described above. As described above, the prediction-based trajectory planning module 200 can also be implemented in systems and platforms that are not deployed in a vehicle and not necessarily used in or with a vehicle.

In an example embodiment as shown in FIG. 3, the prediction-based trajectory planning module 200 can be configured to include the trajectory processing module 173 and the prediction module 175, as well as other processing modules not shown for clarity. Each of these modules can be implemented as software, firmware, or other logic components executing or activated within an executable environment of the prediction-based trajectory planning module 200 operating within or in data communication with the in-vehicle control system 150. Each of these modules of an example embodiment is described in more detail below in connection with the figures provided herein.

Data-Driven Prediction-Based System and Method for Trajectory Planning of Autonomous Vehicles A system and method for providing trajectory planning of autonomous vehicles is disclosed herein. Specifically, the present disclosure relates generally to trajectory planning for autonomous vehicles using a data-driven prediction-based method. In one aspect, the system herein may include various sensors, configured to collect data, a computing device, and a prediction module for predicting trajectory of other vehicles and/or dynamic objects in the vicinity of the autonomous vehicle. Initially, the computing device generates a trajectory option, while the prediction module predicts reactions of vehicles and/or dynamic objects examined using data concerning likely trajectories of each vehicle and/or dynamic objects respectively. Data corresponding to predicted reaction can be sent to the computing device to perfect the trajectory option suggested initially. The computing device may subsequently instruct the prediction module to further collect data and conduct predictions to complete the trajectory planning process.

Figure 4:
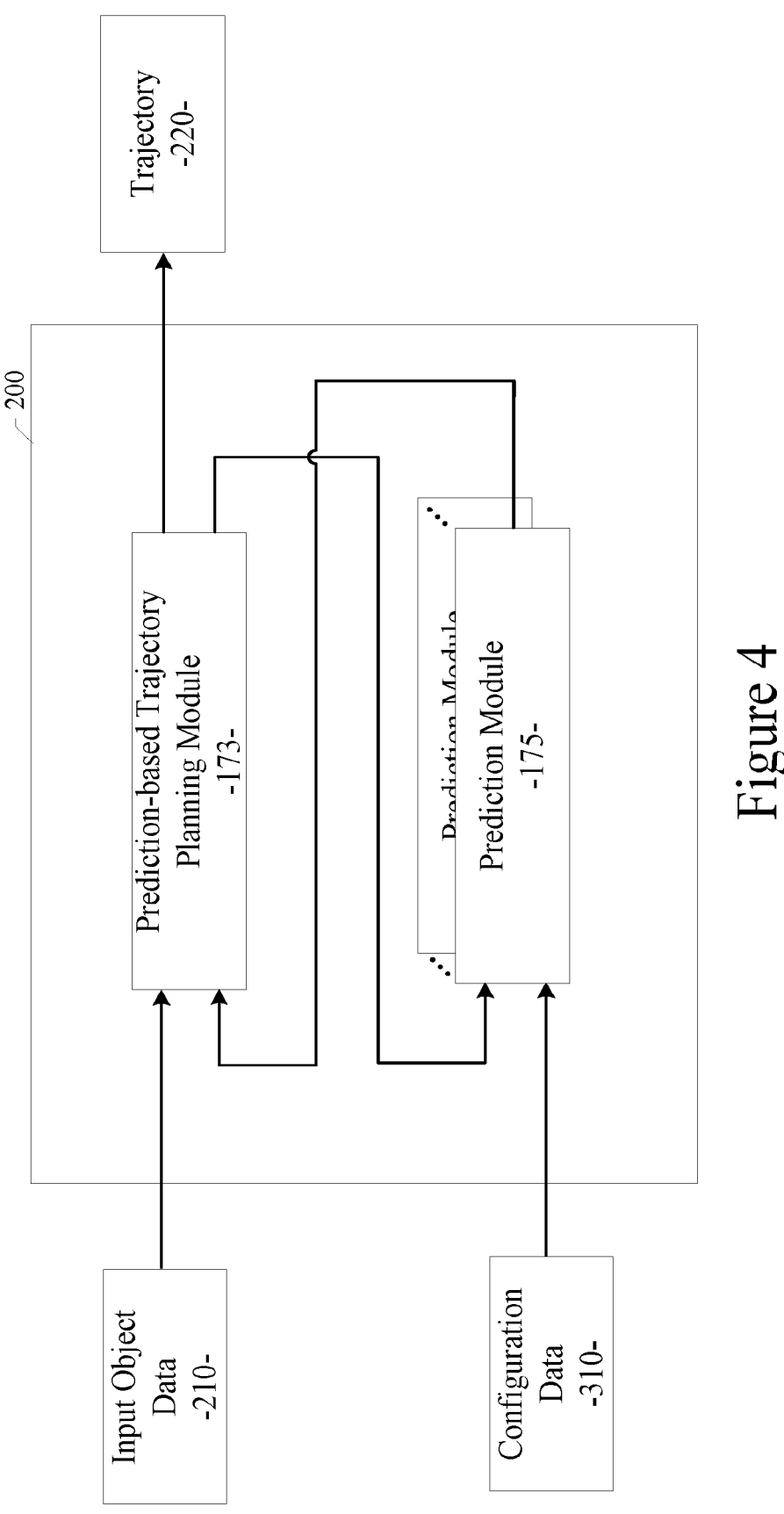

FIG. 4 illustrates the components of the prediction-based trajectory planning module 200 of an example embodiment. As shown, the prediction-based trajectory planning module 200 can be configured to include a trajectory processing module 173 and a prediction module 175. The prediction-based trajectory planning module 200, and the trajectory processing module 173 therein, can receive input object data 210 from one or more of the vehicle sensor subsystems 144, including one or more cameras. The image data from the vehicle sensor subsystems 144 can be processed by an image processing module to identify proximate agents or other objects (e.g., moving vehicles, dynamic objects, or other objects in the proximate vicinity of the vehicle 105). The process of semantic segmentation can be used for this purpose. The information related to the identified proximate agents or other objects can be received by the prediction-based trajectory planning module 200, and the trajectory processing module 173 therein, as input object data 210. The trajectory processing module 173 can use the input object data 210 as part of a trajectory planning process. In particular, the trajectory processing module 173 can initially generate a first suggested trajectory for the autonomous vehicle 105. The first suggested trajectory can correspond to a particular path for navigating the vehicle 105 to a desired destination. The first suggested trajectory can also correspond to a particular path for controlling the vehicle 105 to avoid obstacles detected in the proximity of the vehicle 105. The first suggested trajectory can also correspond to a particular path for directing the vehicle 105 to perform a particular action, such as passing another vehicle, adjusting speed or heading to maintain separation from other vehicles, maneuvering the vehicle in turns, performing a controlled stop, or the like. In each of these cases, the first suggested trajectory may cause the vehicle 105 to make a sequential change on its speed and heading. As a result of changes in the vehicle's 105 speed or heading, other agents or vehicles on the roadway proximate to the vehicle 105 may react to the vehicle's 105 change in speed or heading or other action. The prediction module 175 is provided in an example embodiment to anticipate or predict the likely reactions of the proximate agents to the vehicle's 105 change in speed or heading. Thus, the trajectory processing module 173 can provide the first suggested trajectory as an input to the prediction module 175. The prediction module 175 can use the first suggested trajectory to generate the likely trajectories, or a distribution of likely trajectories of proximate agents, which are predicted to result from the vehicle 105 following the first suggested trajectory. These likely trajectories of proximate agents can be determined based on the machine learning techniques configured from the training scenarios produced from prior real-world human driver behavior model data collections gathered and trained using the real world data collection system 201 as described above. These likely trajectories can also be configured or tuned using the configuration data 310. Over the course of collecting data from many human driver behavior model driving scenarios and training machine datasets and rule sets (or neural nets or the like), the likely trajectories of proximate agents can be determined with a variable level of confidence or probability. The confidence level or probability value related to a particular predicted trajectory can be retained or associated with the predicted trajectory of each proximate agent detected to be near the vehicle 105 at a point in time corresponding to the desired execution of the first suggested trajectory. The prediction module 175 can generate these predicted trajectories and confidence levels for each proximate agent relative to the first suggested trajectory generated by the trajectory processing module 173. The prediction module 175 can generate the predicted trajectories and corresponding confidence levels for each proximate agent as an output relative to the first suggested trajectory generated by the trajectory processing module 173. As shown in FIG. 4, the output of the prediction module 175 can be fed back to the trajectory processing module 173 as an input. The trajectory processing module 173 can use the predicted trajectories and corresponding confidence levels for each proximate agent as generated by the prediction module 175 to determine if any of the predicted trajectories for the proximate agents may cause the vehicle 105 to violate a pre-defined goal based on a related score being below a minimum acceptable threshold. The trajectory processing module 173 can score the first suggested trajectory as related to the predicted trajectories for any of the proximate agents. The score for the first suggested trajectory relates to the level to which the first suggested trajectory complies with pre-defined goals for the vehicle 105, including safety, efficiency, legality, passenger comfort, and the like. Minimum score thresholds for each goal can be pre-defined. For example, score thresholds related to turning rates, acceleration or stopping rates, speed, spacing, etc. can be pre-defined and used to determine if a suggested trajectory for vehicle 105 may violate a pre-defined goal. If the score for the first suggested trajectory, as generated by the trajectory processing module 173 based on the predicted trajectories for any of the proximate agents, may violate a pre-defined goal, the trajectory processing module 173 can reject the first suggested trajectory and the trajectory processing module 173 can generate a second suggested trajectory. The second suggested trajectory can be provided to the prediction module 175 for the generation of a new set of predicted trajectories and confidence levels for each proximate agent as related to the second suggested trajectory. The new set of predicted trajectories and confidence levels for each proximate agent as generated by the prediction module 175 can be output from the prediction module 175 and provided as an input to the trajectory processing module 173. Again, the trajectory processing module 173 can use the predicted trajectories and confidence levels for each proximate agent corresponding to the second suggested trajectory to determine if any of the predicted trajectories for the proximate agents may cause the vehicle 105 to violate a pre-defined goal based on a related score being below a minimum acceptable threshold. If the score for the second suggested trajectory, as generated by the trajectory processing module 173 based on the new set of predicted trajectories for any of the proximate agents, may violate a pre-defined goal, the trajectory processing module 173 can reject the second suggested trajectory and the trajectory processing module 173 can generate a third suggested trajectory. This process can be repeated until a suggested trajectory generated by the trajectory processing module 173 and processed by the prediction module 175 results in predicted trajectories and confidence levels for each proximate agent that cause the suggested trajectory for the vehicle 105 to satisfy the pre-defined goals based on the a related score being at or above a minimum acceptable threshold. Alternatively, the process can be repeated until a time period or iteration count is exceeded. If the process of an example embodiment as described above results in predicted trajectories, confidence levels, and related scores that satisfy the pre-defined goals, the corresponding suggested trajectory 220 is provided as an output from the prediction-based trajectory planning module 200 as shown in FIG. 4.

Figure 5:
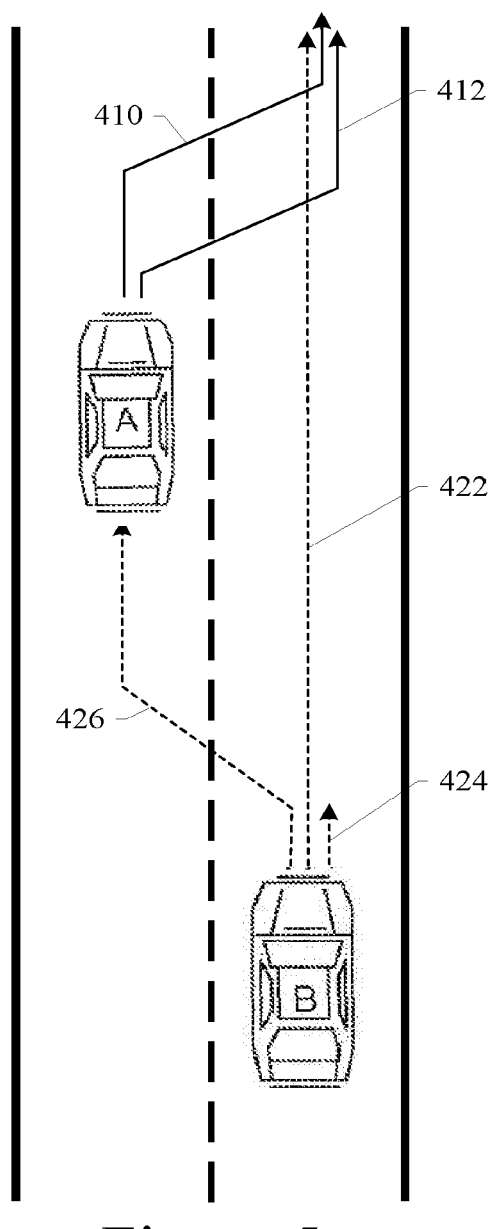
FIG. 5 illustrates an example driving scenario showing the prediction-based trajectory planning of an example embodiment.

FIG. 5 illustrates an example driving scenario 401 showing the prediction-based trajectory planning of an example embodiment. In the example embodiment, the prediction-based trajectory planning module 200 uses object data 210 received from the vehicle sensor subsystem and the predicted trajectories and confidence levels or probabilities for proximate agents as generated by the prediction module 175, as described above. Referring to FIG. 5, the trajectory processing module 173 may initially generate a first proposed or suggested trajectory or path 410 for the autonomous vehicle A at a given point in time. A trajectory or path can be specified as a collection of waypoints from a current vehicle position to a desired vehicle position along a designated path. For example, as shown in FIG. 5, an autonomous vehicle A is shown on a roadway with multiple lanes. For purposes of the illustrated example, the prediction-based trajectory planning module 200 can be considered resident in or operating with the autonomous vehicle A. In the illustrated example, a proximate agent B (e.g., another vehicle or dynamic object on the roadway) occupies a position behind and to the right of the autonomous vehicle A in an adjacent lane and traveling in the same direction of travel. The presence, speed, and heading of the proximate agent B can be determined based on the object data received from the vehicle sensor subsystem.

In the illustrated example of FIG. 5, the prediction module 175 first provides an initial prediction of the movement of the proximate object (vehicle B), which could be in the form of a set of predicted trajectories with their corresponding probability (e.g., a predicted trajectory distribution), namely, trajectory 422 with probability 0.4, trajectory 424 with probability 0.2, and trajectory 426 with probability 0.4. To further explain the three predicted trajectories in the example of FIG. 5, predicted trajectory 422 anticipates that the vehicle B will speed up in its current lane; predicted trajectory 424 anticipates that the vehicle B will slow down in its current lane; and predicted trajectory 426 anticipates that the vehicle B will perform a lane change maneuver. The trajectory processing module 173 can generate the first suggested trajectory 410, which enables the vehicle A to smoothly perform a lane change to the right lane in the example of FIG. 5. As described above, the first suggested trajectory 410 can be sent to the prediction module 175, where a new predicted trajectory distribution is generated based on the first suggested trajectory 410. In this case, the new predicted trajectory distribution is in the form of the same set of trajectory options 422, 424, 426, with updated probability values 0.5, 0.1, 0.4 respectively. To further analyze the example scenario shown in FIG. 5, vehicle A may try to execute first suggested trajectory 410. However, in this example, vehicle B has a high probability that the driver does not want to give way to vehicle A; and so there is a high probability that vehicle B will speed up to execute trajectory 422 to advance along the current lane. This high probability is indicated by the updated probability value of 0.5 for trajectory option 422 as generated by the prediction module 175. In the next iteration of the trajectory processing module 173, when the first suggested trajectory 410 is proposed and the high probability trajectory 422 is predicted, the score corresponding to the first suggested trajectory 410 relative to the high probability trajectory 422 as generated by the trajectory processing module 173 will be very low, which is indicative that vehicle A will not be able to execute the first suggested trajectory 410 and safely perform the desired lane change behavior until vehicle B gets in front of vehicle A. In this case, the first suggested trajectory 410 will be inefficient, if for example, vehicle A needs to get to the right lane to take a nearby highway exit. If the need to get to the right lane to take an exit is a goal of vehicle A, the execution of the first suggested trajectory 410 will fail to accomplish the goal. In this case, the score for the first suggested trajectory 410, as generated by the trajectory processing module 173, will be very low. After evaluation of the low score for the first suggested trajectory 410, the trajectory processing module 173 may propose a second suggested trajectory 412 where a more aggressive lane change operation will be performed. The trajectory processing module 173 can send this second suggested trajectory 412 to the prediction module 175. The prediction module 175 can generate a new predicted trajectory distribution based on the second suggested trajectory 412. In the example of FIG. 5, the new predicted trajectory distribution can include proposed trajectory options 422, 424, and 426 with trajectory probabilities of 0.05, 0.55, and 0.4, respectively. These new trajectory probabilities for the predicted movement of vehicle B are caused by the second suggested trajectory 412, if executed by vehicle A. In this example, the execution of the second suggested trajectory 412 by vehicle A will force vehicle B to slow down and perform its predicted trajectory 424 with a higher probability. Because the execution of the second suggested trajectory 412 by vehicle A will enable vehicle A to meet its goal of getting to the right lane to take a nearby highway exit, the score of the second suggested trajectory 412, as generated by the trajectory processing module 173, will be high. Assuming the higher score of the second suggested trajectory 412 meets or exceeds the goal threshold, the trajectory processing module 173 can output the second suggested trajectory 412 as an acceptable trajectory and vehicle A can execute the second suggested trajectory 412.

Note that in this example, the feedback loop between the trajectory processing module 173 and the prediction module 175 is performed for only two iterations and for only one proximate object (e.g., vehicle B). In real cases, there will be more iterations and more proximate object trajectories to predict. Also in each iteration, there could be multiple suggested trajectories instead of only one being sent from the trajectory processing module 173 to the prediction module 175. In these cases, multiple trajectory predictions will be made for each of the suggested trajectories sent to the prediction module 175.

Referring now to FIG. 6, a flow diagram illustrates an example embodiment of a system and method 1000 for providing trajectory planning of autonomous vehicles. The example embodiment can be configured to: generate a first suggested trajectory for an autonomous vehicle (processing block 1010); generate predicted resulting trajectories of proximate agents using a prediction module (processing block 1020); score the first suggested trajectory based on the predicted resulting trajectories of the proximate agents (processing block 1030); generate a second suggested trajectory for the autonomous vehicle and generate corresponding predicted resulting trajectories of proximate agents, if the score of the first suggested trajectory is below a minimum acceptable threshold (processing block 1040); and output a suggested trajectory for the autonomous vehicle wherein the score corresponding to the suggested trajectory is at or above the minimum acceptable threshold (processing block 1050).

As used herein and unless specified otherwise, the term "mobile device" includes any computing or communications device that can communicate with the in-vehicle control system 150 and/or the prediction-based trajectory planning module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, IOS, Android, etc.

As used herein and unless specified otherwise, the term "network resource" includes any device, system, or service that can communicate with the in-vehicle control system 150 and/or the prediction-based trajectory planning module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3-MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VOIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the prediction-based trajectory planning module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, Extensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the prediction-based trajectory planning module 200 can be implemented using systems that enhance the security of the execution environment, thereby improving security and reducing the possibility that the in-vehicle control system 150 and/or the prediction-based trajectory planning module 200 and the related services could be compromised by viruses or malware. For example, the in-vehicle control system 150 and/or the prediction-based trajectory planning module 200 can be implemented using a Trusted Execution Environment, which can ensure that sensitive data is stored, processed, and communicated in a secure way.

Figure 7:
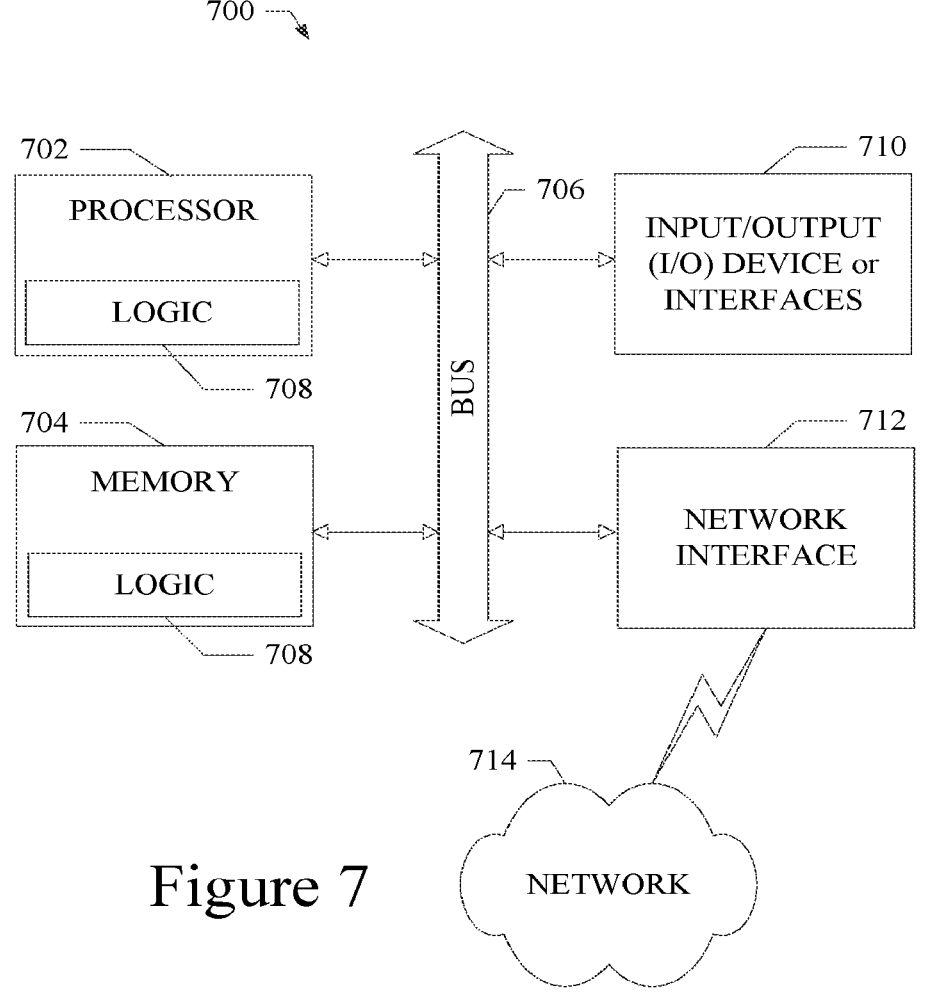
FIG. 7 shows a diagrammatic representation of machine in the example form of a computer system within which a set of instructions when executed may cause the machine to perform any one or more of the methodologies discussed herein.

FIG. 7 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a data processor; and
a trajectory planning module executable by the data processor and configured to perform a trajectory planning operation for an autonomous vehicle, the trajectory planning operation includes:
generating a suggested trajectory for the autonomous vehicle and a distribution of predicted resulting trajectories for each of proximate agents using a prediction module, the distribution of predicted resulting trajectories being reactions to the suggested trajectory of the autonomous vehicle, wherein the proximate agents are vehicles in vicinity of the autonomous vehicle;
determining whether a score of the suggested trajectory based on the distribution of predicted resulting trajectories of the proximate agents violates or satisfies a pre-defined goal; and
upon determination that the suggested trajectory violates the pre-defined goal, rejecting the suggested trajectory and generating a new suggested trajectory for the autonomous vehicle and a new distribution of predicted resulting trajectories for each of the proximate agents using the prediction module; or
upon determination that the suggested trajectory satisfies the pre-defined goal, providing the suggested trajectory as an output from trajectory planning module,
wherein the trajectory planning operation is repeated until a predetermined condition is met, wherein the trajectory planning module is configured to cause a vehicle control subsystem of the autonomous vehicle to manipulate the autonomous vehicle to follow the suggested trajectory upon determination that the suggested trajectory satisfies the pre-defined goal.

2. The system of claim 1, wherein the predetermined condition is met upon determination that the new suggested trajectory for the autonomous vehicle satisfies the pre-defined goal.

3. The system of claim 1, wherein the predetermined condition is met upon determination that an iteration count of the trajectory planning operation has exceeded a maximum iteration count.

4. The system of claim 1, wherein the predetermined condition is met upon determination that a time period during which the trajectory planning operation is performed has exceeded a maximum time period.

5. The system of claim 1, wherein the score of the suggested trajectory based on the distribution of predicted resulting trajectories of the proximate agents violates the pre-defined goal upon determination that the score of the suggested trajectory is below a minimum acceptable threshold.

6. The system of claim 1, wherein the score of the suggested trajectory based on the distribution of predicted resulting trajectories of the proximate agents satisfies the pre-defined goal upon determination that the score of the suggested trajectory is at or above a minimum acceptable threshold.

7. The system of claim 1, wherein the distribution of predicted resulting trajectories includes a set of predicted trajectories with probability values obtained based on the suggested trajectory, wherein each of the predicted trajectories in the distribution of predicted resulting trajectories has a corresponding probability value obtained based on the suggested trajectory.

8. The system of claim 7, wherein the new suggested trajectory for the autonomous vehicle is generated upon determination that the score of the suggested trajectory corresponding to a highest probability value of the probability values is below a minimum acceptable threshold.

9. The system of claim 7, wherein the new suggested trajectory for the autonomous vehicle is not generated upon determination that the score of the suggested trajectory corresponding to a highest probability value of the probability values is at or above a minimum acceptable threshold.

10. A method comprising:
repeating a trajectory planning operation until a predetermined condition is met,
wherein the trajectory planning operation includes:
generating a suggested trajectory for an autonomous vehicle and a distribution of predicted resulting trajectories for each of proximate agents using a prediction module, the distribution of predicted resulting trajectories being reactions to the suggested trajectory of the autonomous vehicle, wherein the proximate agents are vehicles in vicinity of the autonomous vehicle;
determining whether a score of the suggested trajectory based on the distribution of predicted resulting trajectories of the proximate agents violates or satisfies a pre-defined goal; and
upon determination that the suggested trajectory violates the pre-defined goal, rejecting the suggested trajectory and generating a new suggested trajectory for the autonomous vehicle and a new distribution of predicted resulting trajectories for each of the proximate agents using the prediction module; or upon determination that the suggested trajectory satisfies the pre-defined goal, providing the suggested trajectory as an output from trajectory planning module, the method further comprising causing a vehicle control subsystem of the autonomous vehicle to manipulate the autonomous vehicle to follow the suggested trajectory upon determination that the suggested trajectory satisfies the pre-defined goal.

11. The method of claim 10, wherein the predetermined condition is met upon determination that the new suggested trajectory for the autonomous vehicle satisfies the pre-defined goal.

12. The method of claim 10, wherein the predetermined condition is met upon determination that an iteration count of the trajectory planning operation has exceeded a maximum iteration count.

13. The method of claim 10, wherein the predetermined condition is met upon determination that a time period during which the trajectory planning operation is performed has exceeded a maximum time period.

14. The method of claim 10, wherein the score of the suggested trajectory based on the distribution of predicted resulting trajectories of the proximate agents violates the pre-defined goal upon determination that the score of the suggested trajectory is below a minimum acceptable threshold.

15. The method of claim 10, wherein the score of the suggested trajectory based on the distribution of predicted resulting trajectories of the proximate agents satisfies the pre-defined goal upon determination that the score of the suggested trajectory is at or above a minimum acceptable threshold.

16. The method of claim 10, wherein the distribution of predicted resulting trajectories includes a set of predicted trajectories with probability values obtained based on the suggested trajectory, wherein each of the predicted trajectories in the distribution of predicted resulting trajectories has a corresponding probability value obtained based on the suggested trajectory.

17. The method of claim 16, wherein the new suggested trajectory for the autonomous vehicle is generated upon determination that the score of the suggested trajectory corresponding to a highest probability value of the probability values is below a minimum acceptable threshold.

18. The method of claim 16, wherein the new suggested trajectory for the autonomous vehicle is not generated upon determination that the score of the suggested trajectory corresponding to a highest probability value of the probability values is at or above a minimum acceptable threshold.

* * * * *